(12) United States Patent
Gholmieh et al.

(10) Patent No.: US 11,659,438 B2
(45) Date of Patent: May 23, 2023

(54) STREAMLINED USER PLANE HEADERS FOR HIGH DATA RATES

(71) Applicant: QUALCOMM Incorporated, San Diego, CA (US)

(72) Inventors: Aziz Gholmieh, Del Mar, CA (US); Shailesh Maheshwari, San Diego, CA (US); Srinivasan Balasubramanian, San Diego, CA (US); Gang Xiao, San Diego, CA (US); Leena Zacharias, San Jose, CA (US); Yue Yang, San Diego, CA (US); Gavin Bernard Horn, La Jolla, CA (US); Yu-Ting Yu, San Francisco, CA (US); Bao Vinh Nguyen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/075,345

(22) Filed: Oct. 20, 2020

(65) Prior Publication Data

US 2021/0037418 A1 Feb. 4, 2021

Related U.S. Application Data

(63) Continuation of application No. 15/729,014, filed on Oct. 10, 2017, now Pat. No. 10,841,833.
(Continued)

(51) Int. Cl.
*H04W 4/00* (2018.01)
*H04W 28/06* (2009.01)
(Continued)

(52) U.S. Cl.
CPC ............ *H04W 28/06* (2013.01); *H04L 1/187* (2013.01); *H04L 1/1832* (2013.01); *H04L 47/32* (2013.01); *H04L 47/33* (2013.01); *H04L 47/34* (2013.01)

(58) Field of Classification Search
CPC ... H04L 47/34; H04L 49/9057; H04L 1/1841; H04L 47/32; H04W 28/06
See application file for complete search history.

(56) References Cited

U.S. PATENT DOCUMENTS 6,738,369 B1 5/2004 Hippelainen
7,466,703 B1 12/2008 Arunachalam et al.
(Continued)

FOREIGN PATENT DOCUMENTS

CN 1910856 A 2/2007
CN 103501259 A 1/2014
(Continued)

OTHER PUBLICATIONS

International Search Report and Written Opinion—PCT/US2017/056160—ISA/EPO—dated May 7, 2018.
(Continued)

*Primary Examiner* — Shantell L Heiber
(74) *Attorney, Agent, or Firm* — Arent Fox LLP/Qualcomm Incorporated

(57) ABSTRACT

A method and apparatus for receiving a notification of missing packets include receiving a set of data packets transmitted by a device and having a corresponding set of sequence numbers, identifying one or more data packets having corresponding sequence numbers that fall within the set of sequence numbers and are yet to be received, receiving an indication from the device that the one or more data packets will not be transmitted by the device, and processing
(Continued)

the set of data packets without the one or more data packets in response to receiving the indication.

12 Claims, 10 Drawing Sheets

Related U.S. Application Data

(60) Provisional application No. 62/407,453, filed on Oct. 12, 2016.

(51) Int. Cl.
*H04L 1/1867* (2023.01)
*H04L 47/33* (2022.01)
*H04L 47/32* (2022.01)
*H04L 1/1829* (2023.01)
*H04L 47/34* (2022.01)

(56) References Cited

U.S. PATENT DOCUMENTS

| | | | |
|---|---|---|---|
| 7,680,038 B1 * | 3/2010 | Gourlay | H04L 43/0852 370/468 |
| 10,841,833 B2 | 11/2020 | Gholmieh et al. | |
| 2003/0126514 A1 * | 7/2003 | Shabbir Alam | H04L 1/1887 714/43 |
| 2003/0147396 A1 * | 8/2003 | Jiang | H04L 1/187 370/394 |
| 2004/0125815 A1 | 7/2004 | Shimazu et al. | |
| 2005/0175012 A1 * | 8/2005 | Gupta | H04L 1/1877 370/394 |
| 2005/0243831 A1 * | 11/2005 | Zhang | H04L 1/1848 370/394 |
| 2007/0171829 A1 | 7/2007 | Kojima | |
| 2007/0220404 A1 | 9/2007 | Terui et al. | |
| 2010/0118779 A1 * | 5/2010 | Umesh | H04L 1/1848 370/328 |
| 2014/0094179 A1 * | 4/2014 | Shimizu | H04W 36/023 455/442 |
| 2015/0109925 A1 * | 4/2015 | Kullangal Sridhara | H04L 65/80 370/235 |
| 2015/0181490 A1 * | 6/2015 | Nadas | H04L 1/1854 370/331 |
| 2016/0165017 A1 | 6/2016 | Kwon et al. | |

FOREIGN PATENT DOCUMENTS

| | | |
|---|---|---|
| CN | 105103500 A | 11/2015 |
| CN | 105939282 A | 9/2016 |
| EP | 1333609 B1 | 4/2006 |
| EP | 2991257 A1 | 3/2016 |
| WO | 2015139235 A1 | 9/2015 |
| WO | 2016072747 A1 | 5/2016 |

OTHER PUBLICATIONS

Partial International Search Report—PCT/US2017/056160—ISA/EPO—dated Jan. 30, 2018.

* cited by examiner

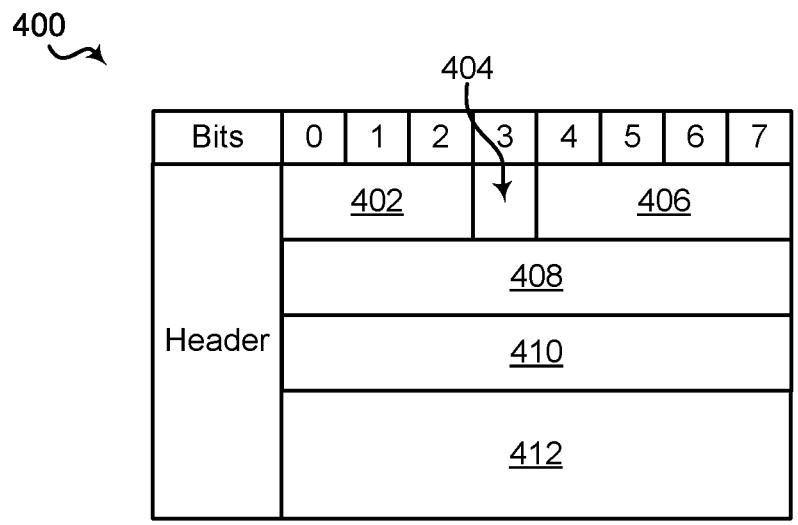
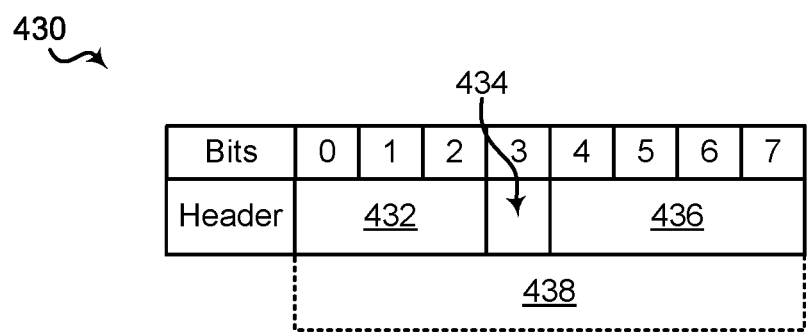
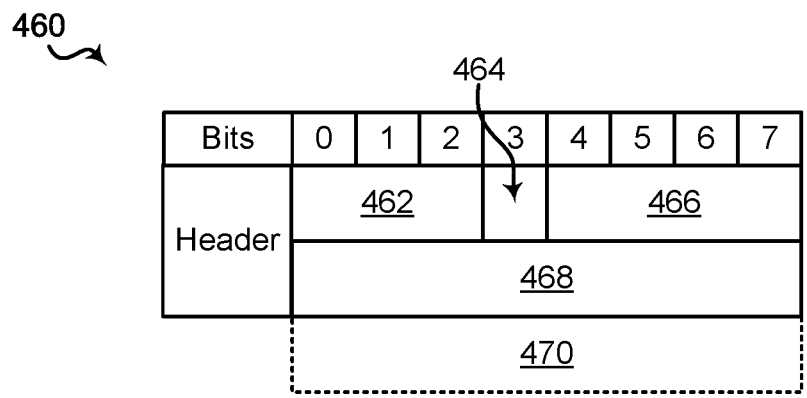
*FIG. 4*

| Length Encoding | Lengths Description | Packet Types |
|---|---|---|
| 0000 | 1500 | TCP IPv4 packet |
| 0001 | 40 | TCP IPv4 Ack |
| 0010 | 52 | TCP IPv4 Ack + Optional fields |
| 0011 | 1498 | UDP IPv4 packet |
| 0100 | 1280 | TCP IPv6 packet |
| 0101 | 1278 | UDP IPv6 packet |
| 0110 | 60 | TCP IPv6 ack |
| 0111 | 72 | TCP IPv6 ack + optional fields??? |
| 1000 | = | Same as previous SDU |
| 1001-1110 | Reserved | Reserved |
| 1111 | Length field present in header | |

| PFI | PDU Format Indicator description |
|---|---|
| 000 | Complete PDU segment with SN in PDCP header |
| 001 | Start of PDU segment with SN in PDCP header |
| 010 | Last PDU segment with explicit PDCP SN/L2 shared header and segment offset |
| 011 | Middle PDU segment with SN and offset |
| 100 | Missing/dropped PDU List (Followed by start mising PDCP SN and N (total number of PDUs missed continuously) |
| 101-110 | Reserved |
| 111 | Control PDU |

STREAMLINED USER PLANE HEADERS FOR HIGH DATA RATES

CROSS REFERENCE TO RELATED APPLICATION

The present Application claims the benefit of the filing date of U.S. patent application Ser. No. 15/729,014, filed on Oct. 10, 2017, titled: "STREAMLINED USER PLANE HEADERS FOR HIGH DATA RATES," which claims the benefit of the filing date of U.S. Provisional Application No. 62/407,453, filed on Oct. 12, 2016, titled: "STREAMLINED USER PLANE HEADERS FOR HIGH DATA RATES," which are hereby expressly incorporated by reference.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

These multiple access technologies have been adopted in various telecommunication standards to provide a common protocol that enables different wireless devices to communicate on a municipal, national, regional, and even global level. For example, 5G NR (new radio) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with requirements, especially in terms of latency and reliability; and massive machine type communications for a very large number of connected devices, and typically transmitting a relatively low volume of non-delay-sensitive information. However, as the demand for mobile broadband access continues to increase, there exists a need for further improvements in 5G communications technology and beyond. Preferably, these improvements should be applicable to other multi-access technologies and the telecommunication standards that employ these technologies.

For a sender on an uplink, where the grant knowledge to transmission time is very limited, the media access control (MAC) header could be interspersed or placed at the end and/or a shared header may be used. Additionally, some vendors want to allow their networks drop packets between radio link control (RLC) layer and packet data convergence protocol (PDCP) with the network side. Some companies want to allow their networks drop packets, thus, requiring a new sequence number (SN) to be provided at the edge, e.g., RLC.

Further, many applications (e.g. video) utilizing 5G communications transport large of amount of data among participants within the network. The user plane, or platform for handling user data, manage the data exchange. When the data gets packaged into packets, the user plane attaches a header to each packet. These headers, while necessary, can add a significant amount of control information to the user data. Therefore, there is desirable for a method and an apparatus achieve streamlined user plane headers for higher data rates to reduce data transmission and speed up the process.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A method and apparatus for receiving a notification of missing packets include receiving a set of data packets transmitted by a device and having a corresponding set of sequence numbers, identifying one or more data packets having corresponding sequence numbers that fall within the set of sequence numbers and are yet to be received, receiving an indication from the device that the one or more data packets will not be transmitted by the device, and processing the set of data packets without the one or more data packets in response to receiving the indication.

A method for sending a packet having reduced number of bits includes determining a length of the packet, identifying a length code based on the length of the packet, the length code being one of multiple length codes associated with predetermined packet lengths, embedding the length code into a header of the packet, omitting a length field indicating the length of the packet to reduce a number of bits in a header of the packet, wherein the length code includes fewer bits than the length field, and transmitting the packet.

Another method for sending a packet having reduced number of bits includes determining a type of the packet by examining whether a payload of the packet includes a complete sequence or a first segment of a sequence, identifying, in response to determining the type of the packet, a format indicator value representing the type of the packet, embedding the format indicator value into a header of the packet, omitting a segment offset field indicating an offset of the payload in the sequence, wherein the format indicator value includes fewer bits than the segment offset field, and transmitting the packet.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 4 is a schematic diagram showing packet headers;

FIG. 6 is an example table of length encodings, lengths, and packet types;

FIG. 8 is an example table of protocol data unit (PDU) format indicators and associated descriptions;

DETAILED DESCRIPTION

Figure 1:
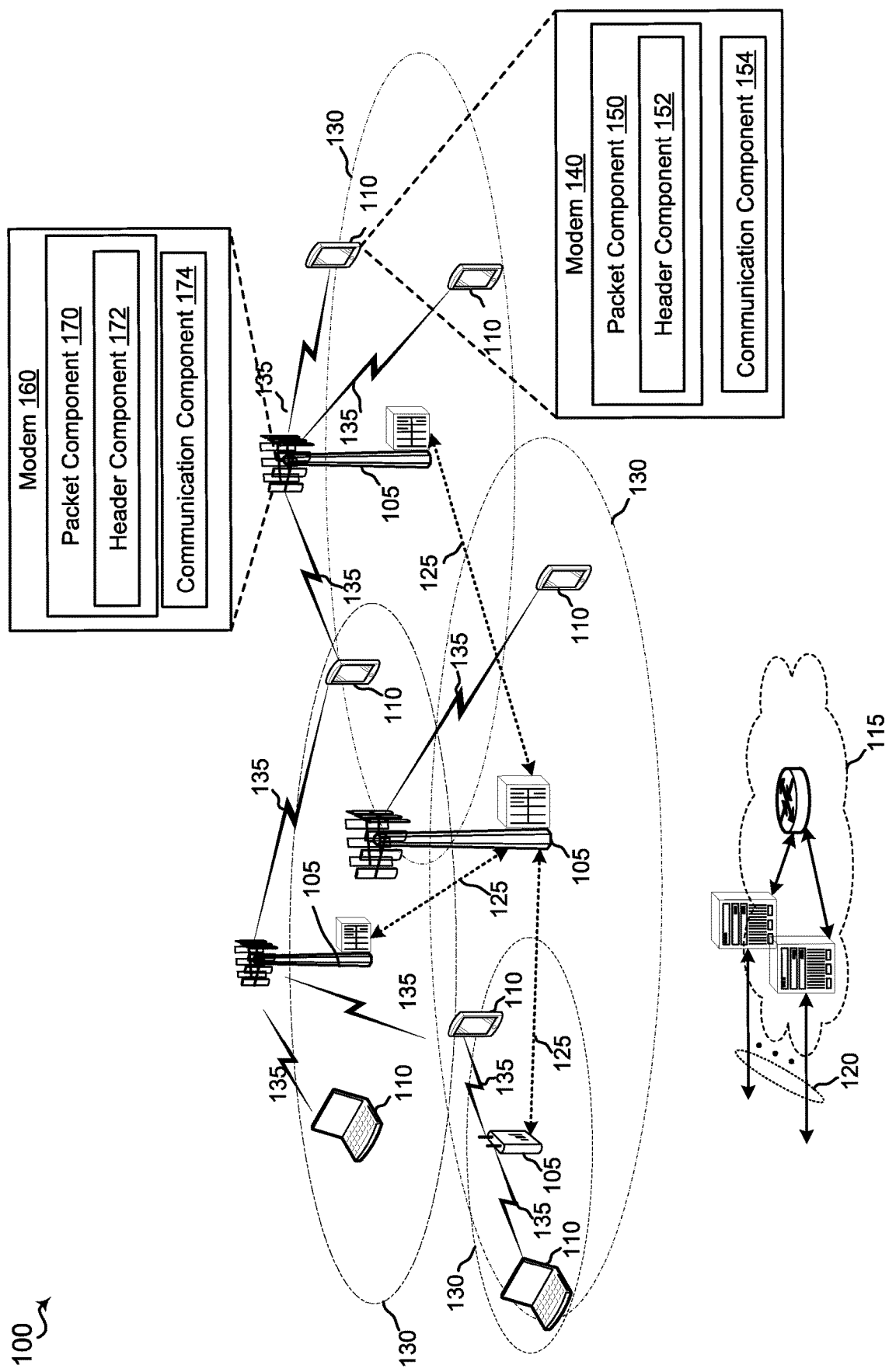
FIG. 1 is a schematic diagram of an example of a wireless communication network including at least one user equipment (UE)

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

In an aspect, a user equipment (UE) and/or user plane may be configured to move the packet size from the MAC to the RLC layer by adding at the MAC layer the sizes of consecutive packets belonging to the same logical RLC channel or duplicate MAC size information in RLC. In an additional aspect, UE and/or user plane may be further configured with a reliable protocol to jump over some sequence numbers, for example, by using a "Forward Status Protocol Data Unit" or "Forward Status PDU" wherein the transmitter informs the receiver about sequence numbers that may not be transmitted. The sender then can ask the receiver to move the receiver's window forward and/or pass the packets to the upper layer per the receiver's logic. In some examples the UE may be the sender and the base station may be the receiver. In other examples, the base station may be the sender and the UE may be the receiver. The UE could reorder separately IP packet flows, and can have a more elaborate logic than the receiver's window common to IP packet flows. For example, in Radio Link Control (RLC) protocol, the receiver's window is a receive state variable. This state variable holds the value of the sequence number following the last n-sequence completely received acknowledged mode data PDU (AMD PDU), and it serves as the lower edge of the receiving window. It is initially set to 0, and is updated whenever the acknowledged mode RLC entity receives an AMD PDU with SN set to the window value.

In a further additional aspect, additional header format optimizations may be implemented, for example, omitting a portion of the header when the segment offset is equal to 0, when combining it with the type of the header. See below for detailed explanations. Specifically, to save bits on common packet sizes, it is possible to omit the actual size field, for a subset of known sizes. This subset of common PDCP header sizes can either be hardcoded in the standard or configured by the network. For example, a length encoding field can either carry implicitly the packet size or it can indicate the actual length is included. One value can be reserved to mean the same as the previous service data unit (SDU). Another value means that the size is not one of the default values, and the full size is included. In general, the network could configure a different table per call, depending on the active session (e.g. VoLTE, Data, VT), and depending on the actual sizes generated by the applications, which can change over time.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

Referring to FIG. 1, in accordance with various aspects of the present disclosure, the wireless communication network 100 may include one or more base stations 105, one or more UEs 110, and a core network 115. When the base stations 105 and the UEs 110 exchange packets within the user plane, each packets includes headers and payloads. The payloads include user information transmitted between the base stations 105 and the UEs 110, and the headers include information necessary for the transmission. The UEs 110 and the base stations 105 rely on components to analyze, tailor, and exchange packets and packet headers.

Specifically, the UE 110 includes a modem 140, a packet component 150, a header component 152, and a communication component 154. The packet component 150 may analyze and determine the characteristics associated with a packet. The header component 152 may analyze and determine the contents of the packet header. The communication component 154 may send and/or receive packets via transceivers within the UE 110.

Similarly, the base station 105 includes a modem 160, a packet component 170, a header component 172, and a communication component 174, which may execute functions similar to the packet component 150, the header component 152, and the communication component 154. The modem 160 may be configured to communicate with other base stations 105 and UEs 110 via a cellular network or other wireless and wired networks. The modem 140 may be configured to communicate via a cellular network, a Wi-Fi network, or other wireless and wired networks. The modems 140, 160 may receive and transmit data packets, via transceivers.

The core network 115 may provide user authentication, access authorization, tracking, internet protocol (IP) connectivity, and other access, routing, or mobility functions. The base stations 105 may interface with the core network 115 through backhaul links 120 (e.g., 51, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., Xl, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, the base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

A UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
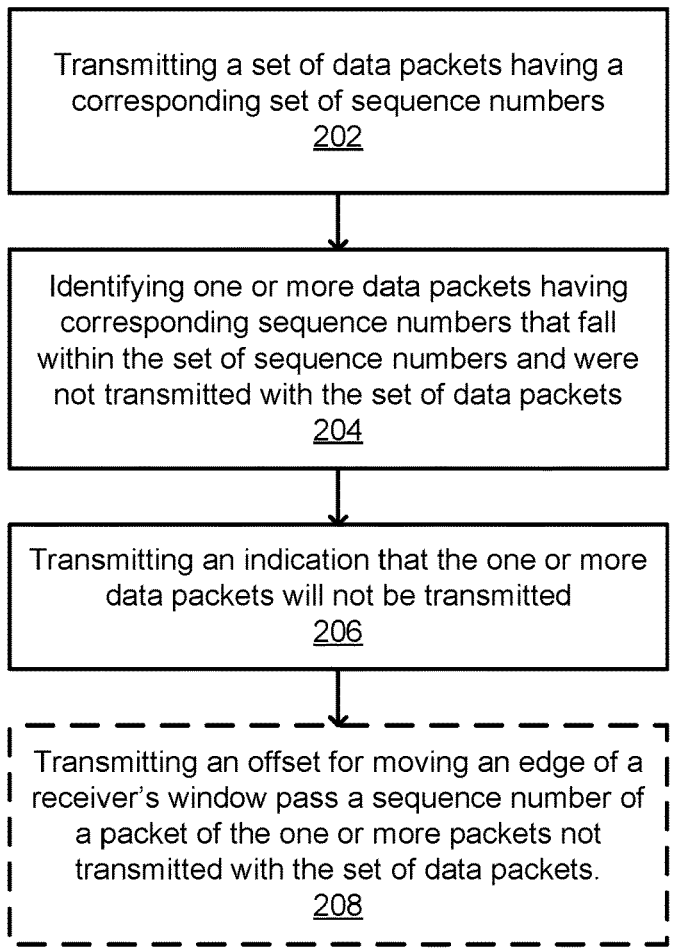
FIG. 2 is an example method of notifying receiver of missing packets.

Turning now to FIG. 2, an aspect of the present disclosure includes a method 200 of notifying the receiver of missing packets that includes the UE 110 transmitting (202) a set of data packets having a corresponding set of sequence numbers to the base station 105. For example, the communication component 154 may transmit (202), via a transceiver 902, 7 packets having sequence numbers 1, 3, 5, 6, and 8-10 to the communication component 174. The 7 packets, numbered 1, 3, 5, 6, and 8-10, may be part of a sequence.

Next, in some implementations, the UE 110 may identify (204) one or more data packets having corresponding sequence numbers that fall within the set of sequence numbers and that did not transmit with the set of data packets. For example, the packet component 150 may identify (204) 3 packets, having sequence numbers 2, 4, and 7, that will not be transmitted to the base station 105. The packets 2, 4, and 7 may be part of the same sequence as the packets numbered 1, 3, 5, 6, and 8-10. The packets that did not transmit may be continuous in the sequence or not continuous in the sequence.

Next, in some implementations, the UE 110 may transmit (206) an indication that the one or more data packets will not be transmitted. For example, the communication component 154 of the UE 110 may transmit (206), via a transceiver 902, an indication to the communication component 174 to inform the base station 105 that the UE 110 will not be sending the packets numbered 2, 4, and 7 to the base station 105. While the non-limiting example above includes 10 packets, different numbers of packets also fall within the scope of the present disclosure.

In an optional implementation, the UE 110 may transmit (208) an offset for moving an edge of a receiver's window pass a sequence number of a packet of the one or more packets not transmitted with the set of data packets. For example, the communication component 154 may transmit (208) an offset to the communication component 174 to move an edge of the base station's window from sequence number 1 to sequence number 3 because the packet with sequence number 2 will not be sent.

Similarly, the base station 105 may also perform the method 200. For example, the communication component 174 may transmit (202), via a transceiver 1002, 8 packets having sequence numbers 1-4, 6, 7, 9, and 10 to the communication component 154. Next, the packet component 170 may identify (204) 2 packets, having sequence numbers 5, and 8, that will not be transmitted to the UE 110. Finally, the communication component 174 of the base station 105 may transmit (206), via a transceiver 1002, an indication to the communication component 154 to inform the UE 110 that the base station 105 will not be sending the packets numbered 5, and 8 to the UE 110. Optionally, the communication component 174 may transmit (208), via the transceiver 1002, an offset to the communication component 154 to move an edge of the UE's window from sequence number 4 to sequence number 6 because the packet with sequence number 5 will not be sent.

Figure 3:
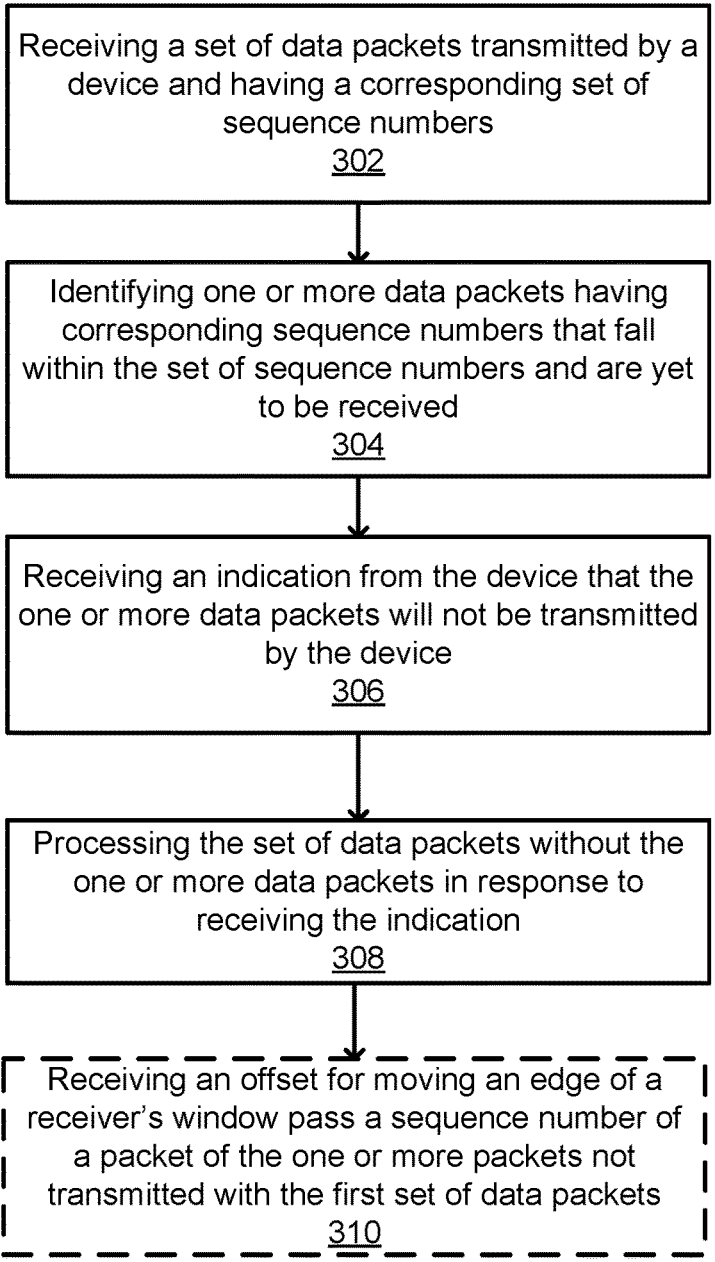
FIG. 3 is an example a method of receiving indication of missing packets.

Turning now to FIG. 3, which shows a method 300 of receiving an indication of missing packets, in some implementations, the base station 105 may receive (302) a set of data packets transmitted by a device and having a corresponding set of sequence numbers. For example, the communication component 174 may receive (302), via the transceiver 1002, 7 data packets transmitted by the communication component 154 and having sequence numbers 1, 3, 5, 6, and 8-10 from the communication component 154.

Next, the base station 105 may identify (304) one or more data packets having corresponding sequence numbers that fall within the set of sequence numbers and are yet to be received. For example, the packet component 170 may identify (304) the packets numbered 2, 4, and 7 that have yet to be received by the communication component 174.

Next, the base station 105 may receive (306) an indication from the device that the one or more data packets will not be transmitted. For example, the communication component 174 may receive, via the transceiver 1002, an indication from the communication component 154 that the packets numbered 2, 4, and 7 will not be transmitted. The indication may be a Forward Status PDU or other suitable data structures.

In response to receiving the indication, the base station 105 may process (308) the set of data packets without the one or more data packets in response to receiving the indication. For example, after receiving (306), via the transceiver 1002, the indication, the packet component 170 may process (308) the data packets numbered 1, 3, 5, 6, and 8-10.

Optionally, the base station 105 may receive (310) an offset for moving an edge of a receiver's window pass the second corresponding set of sequence numbers. For example, the base station 105 may receive (310), via the transceiver 1002, an offset from the communication component 154 to move an edge of the base station's window from sequence number 1 to sequence number 3 because the packet with sequence number 2 will not be sent. Alternatively or additionally, the UE 110 may reorder the received packets to account for the missing packets, and/or pass the received packets to an upper layer.

Similarly, the UE 110 may also perform the method 300. For example, the communication component 154 may receive (302), via the transceiver 902, 8 packets having sequence numbers 1-4, 6, 7, 9, and 10 from the communication component 174. Next, the packet component 150 may identify (304) 2 packets numbered 5 and 8. Next, the communication component 154 may receive, via the transceiver 902, an indication that the packets numbered 5 and 8 will not be transmitted. After receiving (306), via the transceiver 902, the indication, the packet component 150 may process (308) the data packets numbered 1-4, 6, 7, 9, and 10. In optional implementations, the UE 110 may receive (310), via the transceiver 902, an offset from the communication component 174 to move an edge of the UE's window from sequence number 4 to sequence number 6 because the packet with sequence number 5 will not be sent. Alternatively or additionally, the UE 110 may reorder the received packets to account for the missing packets, and/or pass the received packets to an upper layer.

FIG. 4 shows examples of packet headers. A packet header 400 includes a protocol data unit (PDU) format indicator 402, a reserved field 404, a length indicator 406, an optional length field 408, an optional segment offset 410, and an optional L2 Shared header 412. A packet header 430 with a reduced header includes a PDU format indicator 432, a reserved field 434, and a length indicator 436. Another packet header 460 with a reduced header includes a PDU format indicator 462, a reserved field 464, a length indicator 466, and an optional length field 468.

Figure 5:
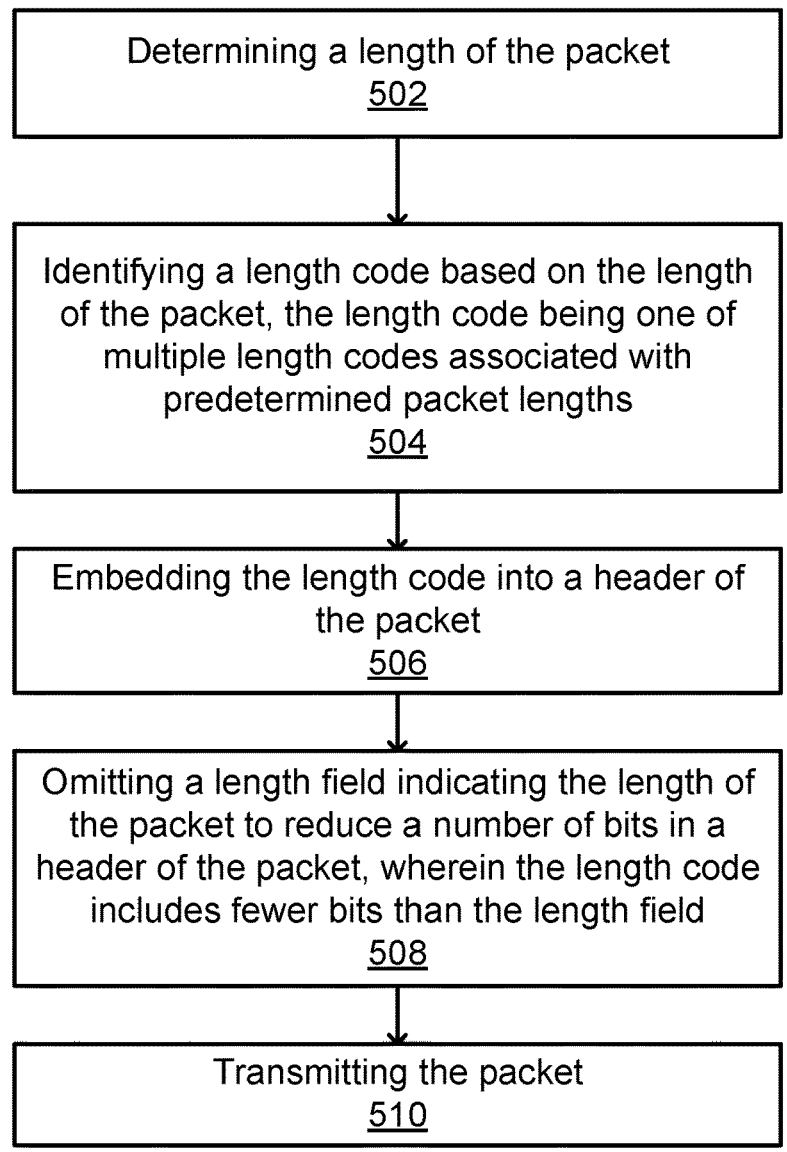
FIG. 5 is an example method of streamlining packet headers.

Turning now to FIG. 5, with reference to FIG. 4, a method 500 of streamlining packet header includes the UE 110 determining (502) a length of the packet. For example, the packet component 150 may determine (502) the length of the packet. The length of the packet may be 1500 bits long, 1498 bits long, or 1280 bits long, for example.

Next, the UE 110 may identify (504) a length code based on the length of the packet, the length code being one of multiple length codes associated with predetermined packet lengths. For example, the packet component 150 may identify (504) the length of the packet to be 1498 bits long, and the associated length code is 0011. The length code 0011 may be one of many length codes associated with different packet lengths. Importantly, the length codes for different packet lengths may be associated with packets of communication standards. For example, a length code of 0100 may indicate a packet length of 1280 bits, or the default length of a TCP IPv6 packet. In another example, a length code of 0000 may indicate a packet length of 1500 bits, or the default length of a TCP IPv4 packet. FIG. 6 shows an example look-up table 600 of some length codes, lengths descriptions, and packet types. Examples include a Transmission Control Protocol/Internet Protocol version 4 data packet (TCP IPv4 packet), a Transmission Control Protocol/Internet Protocol version 4 acknowledgement packet (TCP IPv4 Ack), a TCP IPv4 Ack packet with optional fields, a User Datagram Protocol/Internet Protocol version 4 data packet (UDP IPv4 packet), a Transmission Control Protocol/Internet Protocol version 6 data packet (TCP IPv6 packet), a User Datagram Protocol/Internet Protocol version 6 acknowledgement packet (TCP IPv6 ack), and a TCP IPv6 ack packet with optional fields. Other packet types are possible. The look-up table 600 may be furnished by the communication network 100. The communication network 100 may dynamically change the look-up table 600 depending on the active sessions and/or the size of packets exchanged within the network.

Alternatively, the identifying (504) may include comparing the length of the packet with a length of an immediately previous packet. If the lengths are equal, the UE 110 may identify (504) a corresponding length code indicating that the length of the current packet is substantially identical to the length of the immediately previous packet.

Returning to FIGS. 4 and 5, in some implementations, the UE 110 may embed (506) the length code into a header of the packet. For example, the header component 152 may embed (506) the length code 0100 into the length indicator 436.

Next, the UE 110 may omit (508) a length field indicating the length of the packet to reduce a number of bits in a header of the packet, wherein the length code includes fewer bits than the length field. For example, the header component 152 of the UE 110 may omit (508) a length field 438 to reduce the number of bits in the packet header 430. Since, in this non-limiting example, the length field 438 includes 16 bits and the length indicator 436 includes 4 bits, utilizing the length code of 0100 instead of the length of 0000010100000000 reduces the size of the packet header 430 by 12 bits.

Lastly, in some implementations, the UE 110 may transmit (510) the packet. For example, the communication component 154 may transmit (510), via the transceiver 902, the packet with the packet header 430 having reduced number of bits to the communication component 174 of the base station 105.

Similarly, the base station 105 may also perform the method 500. For example, the packet component 170 may determine (502) the length of the packet. Next, the packet component 170 may identify (504) the length of the packet to be 70 bits long, and the associated length code is 0110. the header component 172 may embed (506) the length code 0110 into the length indicator 436. The header component 172 of the base station 105 may omit (508) a length field 438 to reduce the number of bits in the packet header 430. The communication component 174 may transmit (510), via the transceiver 1002, the packet with the packet header 430 having reduced number of bits to the communication component 154 of the UE 110.

Figure 7:
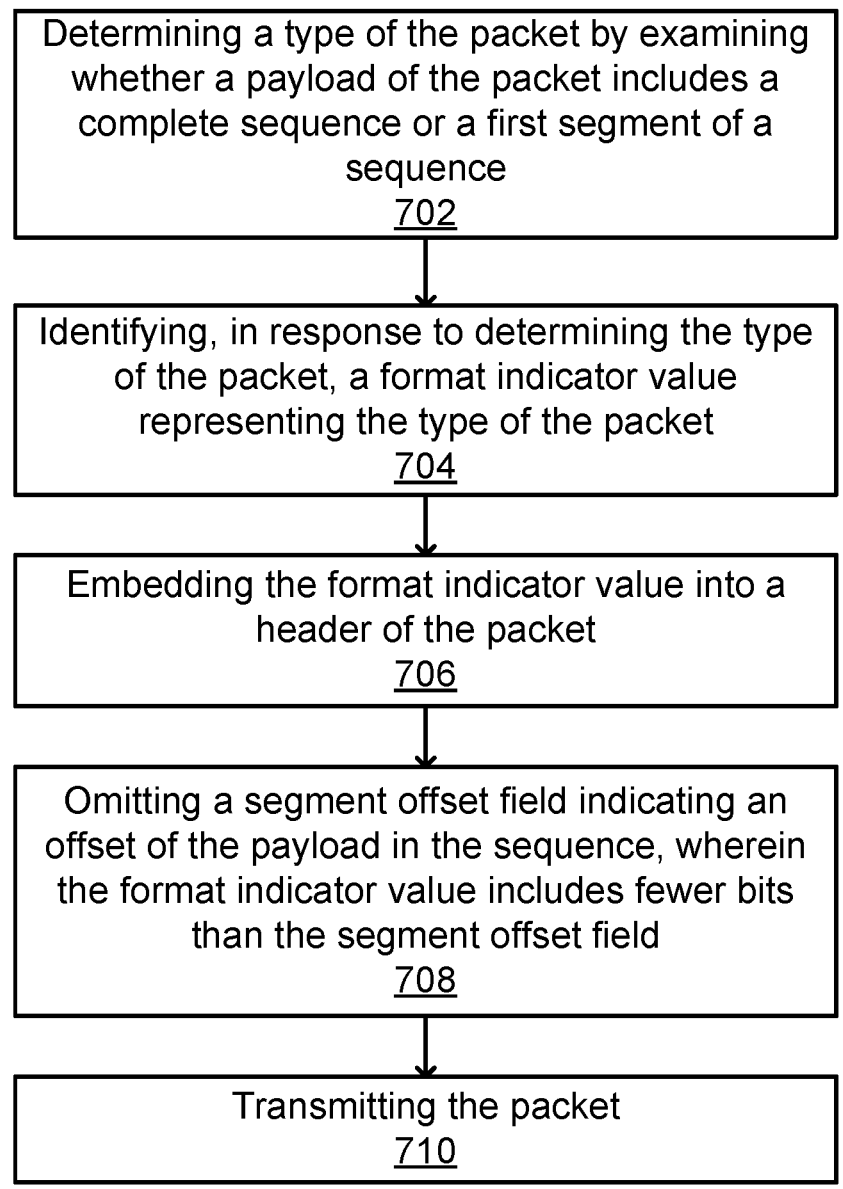
FIG. 7 is another example method of streamlining packet headers.

Turning now to FIG. 7, with reference to FIG. 4, the UE 110 may determine (702) a type of the packet by examining whether a payload of the packet includes a complete sequence or a first segment of a sequence. For example, the packet component 150 may determine (702) that the payload includes a complete sequence (i.e. having all the segments of a message). Alternatively, the packet component 150 may determine (702) that the payload includes the first segment of a sequence. In either case, it would not be necessary to embed a segment offset value into the segment offset field of a packet header.

Still referring to FIGS. 4 and 7, in response to the packet component 150 determining (702) that the payload includes the first segment of a sequence, the UE 110 may identify (704) a format indicator value representing the type of the packet. For example, the header component 152 may identify (704) a format indicator value of 001 that represents the type of the packet, namely packet with the payload including the first segment of a sequence. FIG. 8 shows an example table 800 having numerous PDU format indicator values and PDU format indicator descriptions.

Returning to FIGS. 4 and 7, in some implementations, the UE 110 may embed (706) the format indicator value into a header of the packet. For example, the header component 152 may embed (706) the value 001 into the PDU format indicator 462 of the packet header 460.

Next, the UE 110 may omit (708) a segment offset field indicating an offset of the payload in the sequence, wherein the format indicator value includes less bits than the segment offset field. For example, the header component 152 may omit (708) the segment offset 470 since the payload of the packet includes a first segment of a sequence. Since, in this non-limiting example, the segment offset 470 includes 16 bits and the PDU format indicator 462 includes 3 bits, utilizing the PDU format indicator 462 instead of the segment offset 470 reduces the size of the packet header 460 by 13 bits.

Next, the UE 110 may transmit (710) the packet. For example, the communication component 154 of the UE 110 may transmit (710), via the transceiver 902, the packet having the packet header 460 having reduced number of bits.

Figure 9:
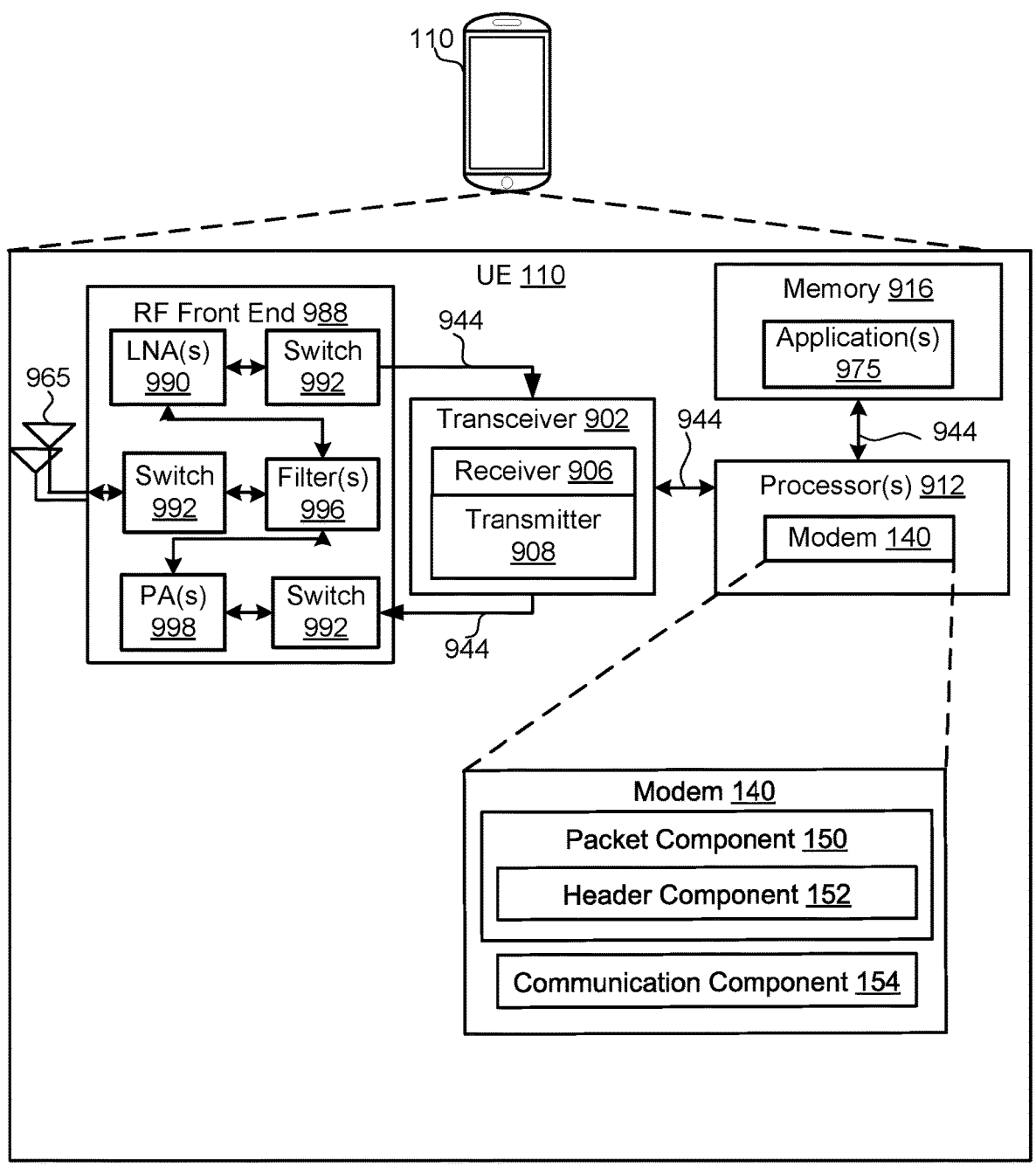
FIG. 9 is a schematic diagram of an example of a user equipment.

Referring to FIG. 9, one example of an implementation of the UE 110 may include a variety of components, some of which have already been described above, but including components such as one or more processors 912 and memory 916 and transceiver 902 in communication via one or more buses 944, which may operate in conjunction with modem 140 and the packet component 150 to enable one or more of the functions described herein related to streamlining the packet headers. Further, the one or more processors 912, modem 140, memory 916, transceiver 902, RF front end 988 and one or more antennas 965, may be configured to support voice and/or data calls (simultaneously or non-simultaneously) in one or more radio access technologies.

In an aspect, the one or more processors 912 can include a modem 140 that uses one or more modem processors. The various functions related to the packet component 150 may be included in modem 140 and/or processors 912 and, in an aspect, can be executed by a single processor, while in other aspects, different ones of the functions may be executed by a combination of two or more different processors. For example, in an aspect, the one or more processors 912 may include any one or any combination of a modem processor, or a baseband processor, or a digital signal processor, or a transmit processor, or a receiver processor, or a transceiver processor associated with transceiver 902. In other aspects, some of the features of the one or more processors 912 and/or modem 140 associated with the packet component 150 may be performed by transceiver 902.

Memory 916 can include any type of computer-readable medium usable by a computer or at least one processor 912, such as random access memory (RAM), read only memory (ROM), tapes, magnetic discs, optical discs, volatile memory, non-volatile memory, and any combination thereof. In an aspect, for example, memory 916 may be a non-transitory computer-readable storage medium that stores one or more computer-executable codes defining the packet component 150 and/or one or more of its subcomponents, and/or data associated therewith, when UE 110 is operating at least one processor 912 to execute the packet component 150 and/or one or more of its subcomponents.

Transceiver 902 may include at least one receiver 906 and at least one transmitter 908. Receiver 906 may include hardware, firmware, and/or software code executable by a processor for receiving data, the code comprising instructions and being stored in a memory (e.g., computer-readable medium). Receiver 906 may be, for example, a radio frequency (RF) receiver. In an aspect, receiver 906 may receive signals transmitted by at least one base station 105. Additionally, receiver 906 may process such received signals, and also may obtain measurements of the signals, such as, but not limited to, Ec/Io, SNR, RSRP, RSSI, etc. Transmitter 908 may include hardware, firmware, and/or software code executable by a processor for transmitting data, the code comprising instructions and being stored in a memory (e.g., computer-readable medium). A suitable example of transmitter 908 may including, but is not limited to, an RF transmitter.

Moreover, in an aspect, UE 110 may include RF front end 988, which may operate in communication with one or more antennas 965 and transceiver 902 for receiving and transmitting radio transmissions, for example, wireless communications transmitted by at least one base station 105 or wireless transmissions transmitted by UE 110. RF front end 988 may be connected to one or more antennas 965 and can include one or more low-noise amplifiers (LNAs) 990, one or more switches 992, one or more power amplifiers (PAs) 998, and one or more filters 996 for transmitting and receiving RF signals.

In an aspect, LNA 990 can amplify a received signal at a desired output level. In an aspect, each LNA 990 may have a specified minimum and maximum gain values. In an aspect, RF front end 988 may use one or more switches 992 to select a particular LNA 990 and its specified gain value based on a desired gain value for a particular application.

Further, for example, one or more PA(s) 998 may be used by RF front end 988 to amplify a signal for an RF output at a desired output power level. In an aspect, each PA 998 may have specified minimum and maximum gain values. In an aspect, RF front end 988 may use one or more switches 992 to select a particular PA 998 and its specified gain value based on a desired gain value for a particular application.

Also, for example, one or more filters 996 can be used by RF front end 988 to filter a received signal to obtain an input RF signal. Similarly, in an aspect, for example, a respective filter 996 can be used to filter an output from a respective PA 998 to produce an output signal for transmission. In an aspect, each filter 996 can be connected to a specific LNA 990 and/or PA 998. In an aspect, RF front end 988 can use one or more switches 992 to select a transmit or receive path using a specified filter 996, LNA 990, and/or PA 998, based on a configuration as specified by transceiver 902 and/or processor 912.

As such, transceiver 902 may be configured to transmit and receive wireless signals through one or more antennas 965 via RF front end 988. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 902 to operate at a specified frequency and power level based on the UE configuration of the UE 110 and the communication protocol used by modem 140.

In an aspect, modem 140 can be a multiband-multimode modem, which can process digital data and communicate with transceiver 902 such that the digital data is sent and received using transceiver 902. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 988, transceiver 902) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 10:
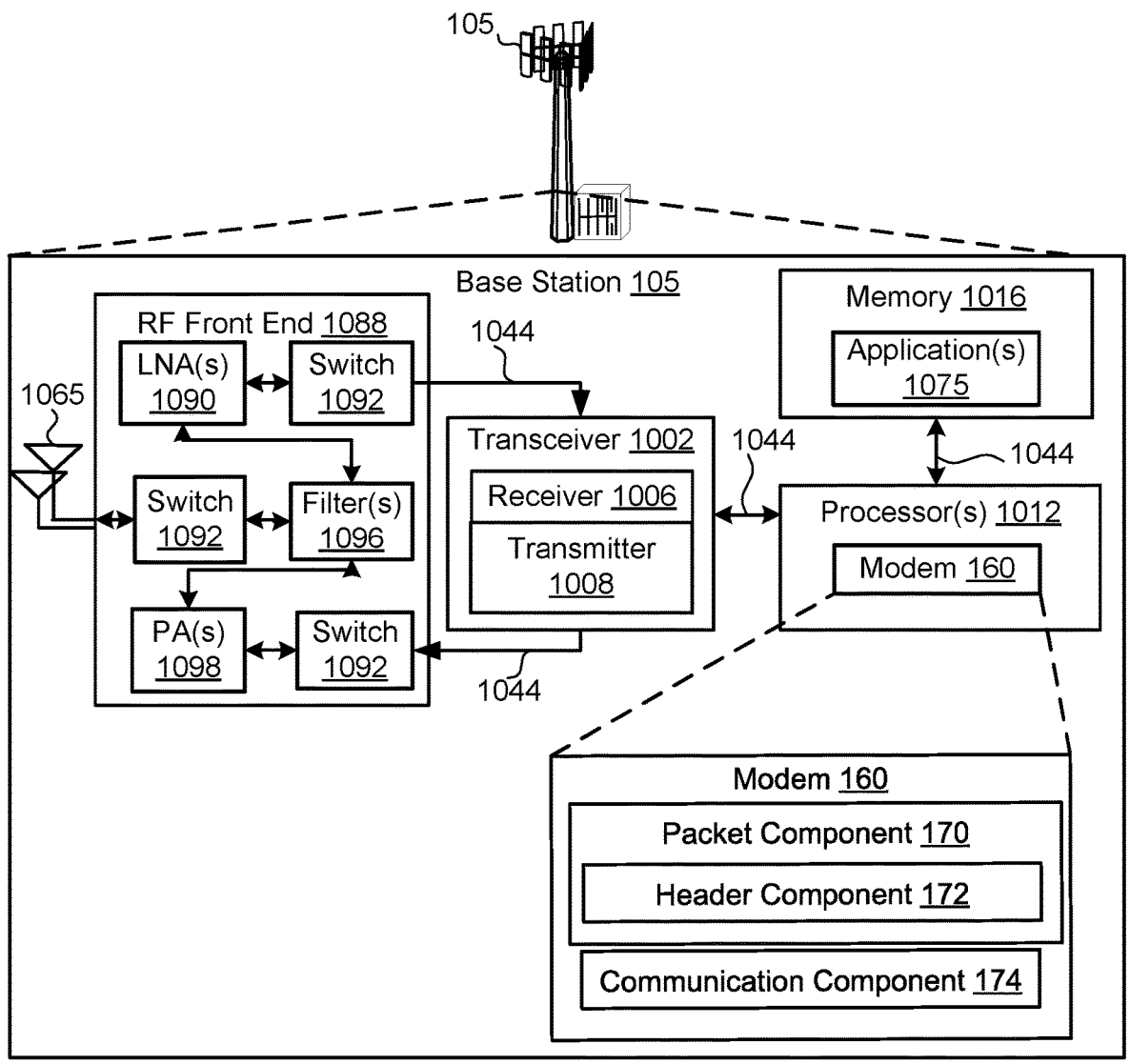
FIG. 10 is a schematic diagram of an example of a base station.

Referring to FIG. 10, one example of an implementation of the base stations 105 may include a variety of components, some of which have already been described above in connection with FIG. 9, but including components such as one or more processors 1012 and memory 1016 and transceiver 1002 in communication via one or more buses 1044, which may operate in conjunction with modem 160 and the communication component 174 to enable one or more of the functions described herein related to streamlining the packet headers.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method, comprising:
   receiving a set of data packets transmitted by a device and having a corresponding set of sequence numbers;
   identifying one or more data packets having corresponding sequence numbers that fall within the corresponding set of sequence numbers and are yet to be received;
   receiving an indication from the device that the one or more data packets will not be transmitted by the device;
   processing the set of data packets without the one or more data packets in response to receiving the indication; and
   receiving an offset for moving an edge of a receiver's window past a sequence number of a packet of the one or more data packets not transmitted with the set of data packets as indicated by the indication.

2. The method of claim 1, further comprising reordering the set of data packets to account for the one or more data packets that will not be transmitted.

3. The method of claim 2, further comprising passing the set of data packets to an upper layer.

4. The method of claim 1, wherein the indication includes a Forward Status protocol data unit (PDU).

5. A user equipment, comprising:
   a memory storing instructions;
   a transceiver; and
   one or more processors coupled with the memory and the transceiver, and configured to execute the instructions to:
   receive, via the transceiver, a set of data packets transmitted by a device and having a corresponding set of sequence numbers;
   identify one or more data packets having corresponding sequence numbers that fall within the corresponding set of sequence numbers and are yet to be received;
   receive, via the transceiver, an indication from the device that the one or more data packets will not be transmitted by the device;
   process the set of data packets without the one or more data packets in response to receiving the indication; and
   receive, via the transceiver, an offset for moving an edge of a receiver's window past a sequence number of a packet of the one or more data packets not transmitted with the set of data packets as indicated by the indication.

6. The user equipment of claim 5, wherein the one or more processors are further configured to execute the instructions to reorder the set of data packets to account for the one or more data packets that will not be transmitted.

7. The user equipment of claim 6, wherein the one or more processors are further configured to execute the instructions to pass the set of data packets to an upper layer.

8. The user equipment of claim 5, wherein the indication includes a Forward Status protocol data unit (PDU).

9. A non-transitory computer readable medium having instructions stored therein that, when executed by one or more processors of a user equipment (UE), cause the UE to:
   receive a set of data packets transmitted by a device and having a corresponding set of sequence numbers;
   identify one or more data packets having corresponding sequence numbers that fall within the corresponding set of sequence numbers and are yet to be received;
   receive an indication from the device that the one or more data packets will not be transmitted by the device;
   process the set of data packets without the one or more data packets in response to receiving the indication; and
   receive an offset for moving an edge of a receiver's window past a sequence number of a packet of the one or more data packets not transmitted with the set of data packets as indicated by the indication.

10. The non-transitory computer readable medium of claim 9, further comprising instructions that, when executed by one or more processors, cause the UE to reorder the set of data packets to account for the one or more data packets that will not be transmitted.

11. The non-transitory computer readable medium of claim 10, further comprising instructions that, when executed by one or more processors, cause the UE to pass the set of data packets to an upper layer.

12. The non-transitory computer readable medium of claim 9, wherein the indication includes a Forward Status protocol data unit (PDU).

* * * * *